(12) United States Patent
Eckardt

(10) Patent No.: US 8,965,815 B2
(45) Date of Patent: Feb. 24, 2015

(54) METHOD FOR OPERATING AN AUTOMATION DEVICE WITH A FINITE STATE MACHINE WHICH USES A MAPPING UNIT TO CONVERT STATE INFORMATION

(75) Inventor: Dieter Eckardt, Herzogenaurach (DE)

(73) Assignee: Siemens Aktiengesellschaft, München (DE)

( * ) Notice: Subject to any disclaimer, the term of this patent is extended or adjusted under 35 U.S.C. 154(b) by 285 days.

(21) Appl. No.: 13/490,884

(22) Filed: Jun. 7, 2012

(65) Prior Publication Data

US 2012/0317574 A1    Dec. 13, 2012

(30) Foreign Application Priority Data

Jun. 10, 2011  (EP) ...................................... 11169495

(51) Int. Cl.
*G06F 15/18* (2006.01)
*G05B 19/042* (2006.01)

(52) U.S. Cl.
CPC .. *G05B 19/0423* (2013.01); *G05B 2219/25008* (2013.01); *G05B 2219/25451* (2013.01)
USPC ......................................................... 706/12

(58) Field of Classification Search
USPC .................................................... 706/12, 45
See application file for complete search history.

(56) References Cited

U.S. PATENT DOCUMENTS

| | | | |
|---|---|---|---|
| 6,560,235 B1 * | 5/2003 | Jones ............................. | 370/401 |
| 7,991,351 B2 * | 8/2011 | Kuban .............................. | 455/7 |
| 2008/0103732 A1 | 5/2008 | Stoupis et al. | |

FOREIGN PATENT DOCUMENTS

EP              1 612 630 A1    1/2006

* cited by examiner

*Primary Examiner* — David Vincent
(74) *Attorney, Agent, or Firm* — Henry M. Feiereisen LLC

(57) ABSTRACT

In a method for operating an automation device having an internal finite state machine, a mapping unit, an internal data interface operatively connected for flow of information between the internal finite state machine and the mapping unit, and the mapping unit operatively connected for flow of the same information between the internal data interface and an external data interface of a communication module, state information of the internal finite state machine is routed to the mapping unit via the internal data interface, separate state information is derived from the state information received by the mapping unit, and the mapping unit then provides the separate state information to a communication unit of the communication module.

11 Claims, 1 Drawing Sheet

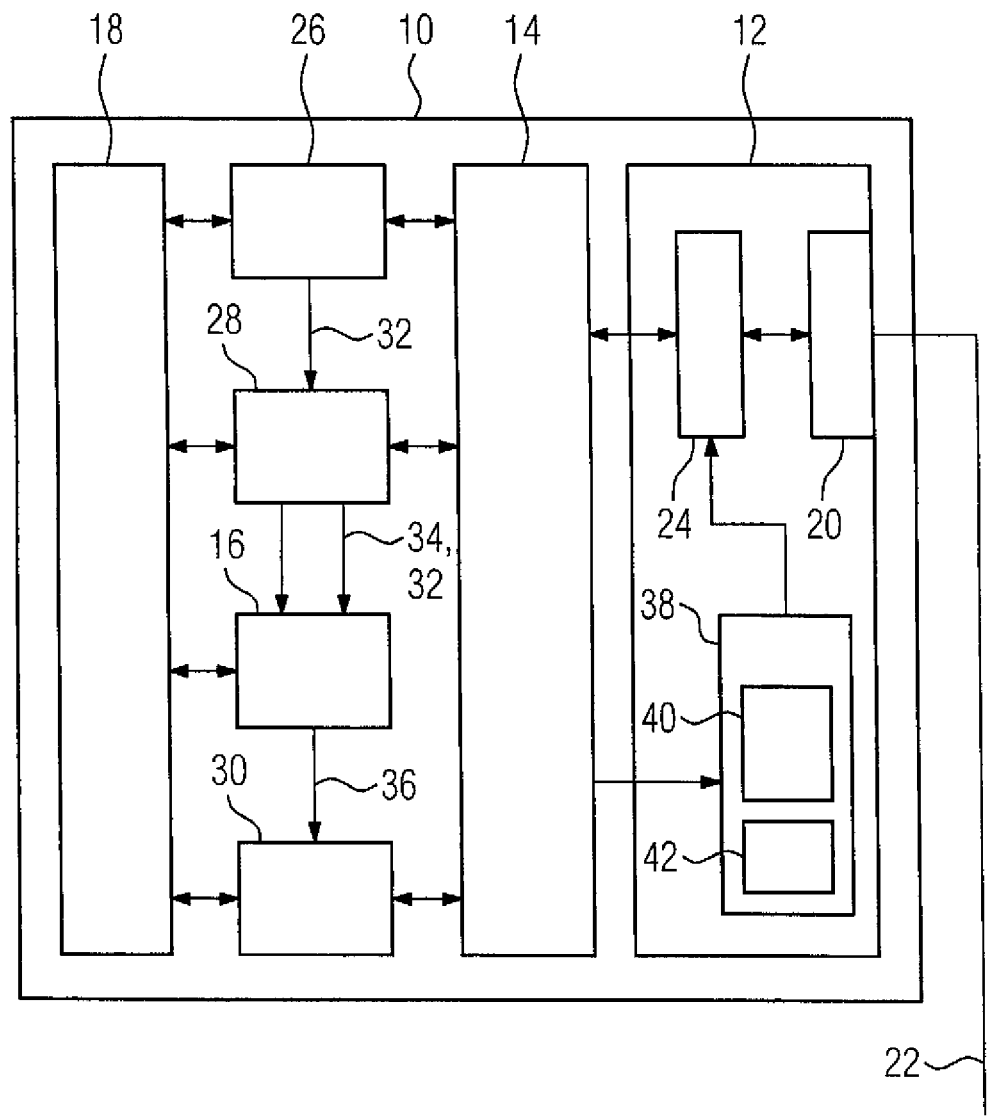

METHOD FOR OPERATING AN AUTOMATION DEVICE WITH A FINITE STATE MACHINE WHICH USES A MAPPING UNIT TO CONVERT STATE INFORMATION

CROSS-REFERENCES TO RELATED APPLICATIONS

This application claims the priority of European Patent Application, Serial No. EP 11169495.6, filed Jun. 10, 2011, pursuant to 35 U.S.C. 119(a)-(d), the content of which is incorporated herein by reference in its entirety as if fully set forth herein.

BACKGROUND OF THE INVENTION

The present invention relates to a method for operating an automation device, in particular in an embodiment as a drive control device. Furthermore, the invention relates to an automation or drive control device operating according to such a method and finally to a computer program for implementing such a method, which can be executed by a processing unit of an automation or drive control device.

The following discussion of related art is provided to assist the reader in understanding the advantages of the invention, and is not to be construed as an admission that this related art is prior art to this invention.

Automation or drive control devices are known per se. The applicant provides automation and drive control devices of different function and performance categories, e.g. under the brand name SIMATIC and/or SINUMERIK.

With drive control devices or generally with automation devices, subsequently occasionally abbreviated only to "device", provision is made for a predetermined or predeterminable behavior with respect to external or internal events. External events may be on/off commands of suchlike. Error or warning messages are considered to be internal events for instance. In order to generate a response to such events (the "behavior" of the device), a finite state machine is provided in the respective device which can be implemented in software, firmware or combinations of software, firmware and hardware. The finite state machine links the external and/or internal events according to a decision logic forming the basis of the finite state machine and educes further reactions from the external and/or internal events, at least one respective state resulting according to the decision logic of the finite state machine, which can for its part form the basis of the further reactions. The respective state if applicable influences the addressability of the device when interconnected with other devices. For instance, a device with the state "faulty" cannot be activated in order to control a technical process.

In order to be able to connect a device of the type cited in the introduction with other devices in an external communication system, e.g. a field bus, for interlocked operation, for instance the field bus/communication standard known under the brand name PROFINET, the device must comprise a corresponding data interface. This data interface is usually mapped onto a further, generalized data interface in the device, so that the device can be used with different external communication systems, without interventions into the actual device being necessary herefor. To make a distinction from the data interface for the external communication system, this data interface is subsequently designated as an internal generalized data interface or in short as an internal data interface. The data interface for the external communication system is accordingly abbreviated to external data interface.

The disadvantage with known devices of the type cited in the introduction is their rather limited flexibility with respect to the possibility of operation on different communication systems. Operation on different communication systems is understood here not to mean a repeatedly alternating connection of a device to different communication systems, but instead the fundamental suitability of a device, and thus the suitability of a device type or device class to which the respective device belongs, in terms of operation on different communication systems.

It would therefore be desirable and advantageous to obviate prior art shortcomings and to provide an improved method for operating an automation device, in particular a drive control unit, on different communication systems with only a minimum of added complexity and costs.

SUMMARY OF THE INVENTION

According to one aspect of the present invention, a method for operating an automation device with an internal finite state machine, a mapping unit, an internal data interface operatively connected for flow of information between the internal finite state machine and the mapping unit, and the mapping unit operatively connected for flow of the same information between the internal data interface and an external data interface of a communication module includes the steps of routing state information of the internal finite state machine to the mapping unit via the internal data interface, deriving separate state information from the state information received by the mapping unit, and providing with the mapping unit the separate state information to a communication unit of the communication module.

According to an advantageous feature of the present invention, generation of state information, which is needed for the respective communication system upon connection to the external data interface, may be decoupled from the finite state machine of the device designated here and below as an internal finite state machine. The designation of this finite state machine as an internal finite state machine is justified on account of the functional position in the device, namely in respect of the communication system on a side facing the internal data interface.

Advantageously, with the aforementioned decoupling, the internal data interface is not designed to transmit the device behavior in any form. However, the internal data interface may transmit information relating to a current state of the device, as is represented by the internal finite state machine (state information). Furthermore, the internal data interface may also transmit other data and in this respect in particular also error messages, error codes etc.

An internal finite state machine which is implemented in the device is normally defined by a specific device profile. A so-called PROFIdrive profile is considered as a conventional drive profile for instance. This is used in devices connected to communication systems in accordance with the Profibus or Profinet standard. With other communication systems, this device profile can generally not be used or only in a specific manner. In this respect the afore-cited decoupling is favorable because states of the internal finite state machine are routed to the mapping unit, which generates separate state information from the states of the internal finite state machine, as are needed during operation of the device on the respective communication system.

Different communication systems, in particular field bus systems, usually exhibit different device profiles and thus also different finite state machines. Finite state machines for a communication system differ for instance by the number of states and/or the type and number of transitions between these states. Because the device's own internal finite state machine engages very deeply into the device and is thus in a way significantly enmeshed with the device, replacing an internal finite state machine is associated with significant complexity and costs. Furthermore, a specific device series would result with each internal finite state machine adjusted to a communication system, since the specific properties of the respective communication system and/or of the device profile do not remain restricted to a communication connection assembly group or in brief a communication module. By means of the decoupling, the internal finite state machine in the device is kept unchanged or at least essentially unchanged, thus obviating the need for special interventions into the base functionality of the respective device.

According to an advantageous feature of the present invention, since with respect to the flow of information in the device, the mapping unit is located between the internal and the external data information and thus in respect of the same flow of information is located on the same side of the internal data interface as the external data interface, the states of the statuses of the internal finite state machine concealed deeply in the device may be provided at a location where access by the communication module is possible. During operation of the device on another communication system, a corresponding generation of the states needed for the respective communication system takes place in the mapping unit from the state information of the internal finite state machine. The thus generated external state information is made available to the communication unit. The mapping unit allows the realization of a virtual finite state machine, to which the communication unit both has access and also generates the states needed for the respective field bus system. Overall, the device can therefore basically be operated on any communication system.

According to another advantageous feature of the present invention, when the mapping unit of the internal finite state machine buffers received states and/or state information or even buffers the same in a specific depth and the mapping unit also takes stored states into account during the generation of state information, there is the possibility of being able to make the state information generated by the mapping unit also dependent on changes in states of the internal finite state machine. Furthermore, ever more complex dependencies can be realized and/or simulated in the mapping unit depending on the memory depth. The ability to map the states of the internal finite state machine becomes more comprehensive on account of the state information stored in the mapping unit. The memory depth may differ here from communication system to communication system.

When aside from states of the internal finite state machine other further additional information is also routed to the mapping unit via the internal data interface and the mapping unit also takes this additional information into account during the generation of the state information, the mapping of the states of the internal state machine by the state information becomes more precise since a state of the internal finite state machine transferred to the mapping unit via the internal data interface can be mapped with the aid of an additional item of information in a first or a second state.

According to another aspect of the invention, an automation device, in particular a drive control unit, used for controlling or affecting technical processes, includes an internal finite state machine, a mapping unit, an internal data interface operatively connected for flow of information between the internal finite state machine and the mapping unit, a communication module having a communication unit connected to an external data interface, wherein the mapping unit is operatively connected between the internal data interface and the communication module for flow of the same information. The automation device is configured to route state information of the internal finite state machine to the mapping unit via the internal data interface, derive separate state information from the state information received by the mapping unit, and provide with the mapping unit the separate state information to the communication unit.

The invention may be implemented in software and therefore also relates to a computer program having program code instructions which can be executed by a computer and on the other hand a storage medium having a computer program of this type as well as finally also an automation device, in particular a drive control unit, in the memory of which such a computer program is or can be loaded as means for implementing the method and its embodiments.

The automation device may be embodied in modular form, with the communication module being constructed as a unit that can be detached from the automation device. The automation device can be adapted to different communication systems with little effort by simply replacing the communication module.

BRIEF DESCRIPTION OF THE DRAWING

Other features and advantages of the present invention will be more readily apparent upon reading the following description of currently preferred exemplified embodiments of the invention with reference to the accompanying drawing, in which the sole:

FIG. 1 shows the basic device architecture of an automation device in the form of a block diagram according to the present invention.

DETAILED DESCRIPTION OF PREFERRED EMBODIMENTS

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown inform of a block diagram a schematically simplified basic device architecture of an automation device 10 addressed here, in particular a drive control unit. The automation device 10 subsequently includes a communication module 12, an internal data interface 14 (internal generalized data interface), a finite state machine designated here and below as an internal finite state machine 16 and a functionality 18 for implementing the actual device functions, in other words for instance for implementing the functions needed for a drive control unit.

An external data interface 20 is provided for the communicative connectability of the automation device 10 with other automation devices (not shown). The automation device 10 can be connected to a field bus 22 by means of the external data interface 20. A communication unit 24 is connected to the external data interface 20 for implementing the respective device profile, in other words for instance for implementing a so-called PROFIdrive profile, if the automation device 10 is or is to be connected to a communication system via the field bus 22 in accordance with the Profibus or Profinet standard.

During the exchange of data with other automation devices, the data is received at the external data interface 20 and prepared by the communication unit 24 in accordance with the respective communication system/device profile. A still more extensive abstraction of the received data takes place by means of the internal data interface 14. Access to an error handler 26 and its error messages, cyclical process data 28 and parameters and acyclical data 30 takes place from there. The functionality 18 for implementing the actual device functions accesses this data and as a function thereof the function of the automation device 10 results and thus in a known manner influences a respective technical process, not shown (illustrated graphically in each instance by the double arrow).

For the internal finite state machine 16, error flags 32 and/or control words 34 influence its formation of state information for the automation device for instance. On account of such data and data which is provided by the functionality 18 for implementing the separate device functions, the internal finite state machine 16 determines the respective device state and makes this available in encoded form with the aid of a state number 36 as an integral part of the parameters and acyclical data 30. The respective state is made available from there in the form of the associated state number 36 via the internal data interface 14 also to the communication unit 24, so that the communicative connection from and to other automation devices can be geared to the respective device state.

When connecting the automation device 10 to a communication system, for which the more internal finite state machine 16 and other functionality of the automation device 10 was configured during its development, the main functionality of the automation device 10 corresponds along general lines to that which was described previously. If the automation device 10 is however to be connected to another communication system, it is highly probable that the communication system, in other words the communication unit 24 adjusted to its use, requires other state information than was the case with the original configuration and the communication system provided there.

A mapping unit 38 is now provided herefor, which receives state information, e.g. the state number 36 generated by the internal finite state machine 16 as well as error flags 32, control words 34 etc, relating to the internal data interface 14. On this basis, the mapping unit 38 of the communication unit 24 provides the adjusted state information for evaluation in the communication module 12.

The mapping unit 38 in this way performs a mapping of the received data to data as is required for the communication module 12 and/or its communication unit 24 depending on the respective communication system. During an adjustment of an automation system 10 to a communication system which was not previously used, as a first approximation only an adjustment of the mapping of internal states performed by the mapping unit 38 and of other data to the data needed for the communication system is needed.

The functionality of the mapping unit 38 may be complex or trivial depending on the application situation, in other words depending on the communication system to be used. For instance, the mapping unit may include a linking logic 40, with which the internal states of the automation device 10 are mapped onto states needed for the communication system. Depending on the number of possible internal states, a simple or comprehensive linking logic 40 results here, which with respect to its main functionality can also be shown as follows for individual fictitious states:

| Current internal state | Mapping result |
| --- | --- |
| A | a |
| B | b |
| C | c |
| — | a |

Here the letters "A", "B" and "C" stand by way of example for internal states of the automation device 10 and the state number in this respect, wherein "-" represents any state and any state number.

The mapping can take place more precisely if not only the respective current state but also a temporally preceding state is taken into account. Temporally preceding can be understood here to be immediately temporally preceding, in other words for instance a state available with a preceding device clock or also the last other state. The mapping unit 38 can combine such consecutive states and provide an item of state information based thereupon and provide the same to the communication unit 24.

One particular embodiment of the mapping unit 38 is characterized in that this buffers the states received from the internal finite state machine 16 in a buffer 42 and in addition to the respective current state, also takes into account preceding states during the provision of state information with the aid of the buffered states. The basic functionality of the linking logic 40 is to this end subsequently shown as above in the form of a table, wherein the linking logic effects the combining of two internal states (current state and preceding (former) state) to form precisely one state for the communication module 12:

| Current internal state | Preceding internal state | Mapping result |
| --- | --- | --- |
| A | A | a |
| A | B | a |
| B | A | b |
| B | B | b |
| C | A | c |
| etc. | etc. | etc. |

This is an example of a functionality of the mapping unit 38, in which this uses a current state received from the internal finite state machine 16 and a buffered state (preceding internal state) to generate a combined state.

Similarly to the possibility of combining two or more internal states to form a state to provide to the communication unit 24, with an extended or alternative embodiment of the mapping unit 38, a splitting of internal states into a plurality of states is possible for the communication module 12. To this end, a further table for the functionality of the mapping unit 38 is shown on the basis of the two tables used above, wherein on account of lack of space, the column headers are abbreviates and "Curr. int. state" stands for "Current internal state", "Pre.int.state" stands for "Preceding internal state", "Mapp.res" stands for "Mapping result" and "Cond." stands for "Condition". A condition of this type is a suitable item of additional information, in other words for instance the value of the error flag 32.

| Curr. int. state | Pre. int. state | Cond. | Mapp. result |
|---|---|---|---|
| A | A | x | a |
| A | A | y | b |
| A | B | — | b |
| — | A | x | a |
| — | A | y | b |

This is an example of a functionality of the mapping unit 38, in which this uses a current state received from the internal finite state machine 16, a buffered state (preceding internal state) and an additional item of information (condition) to generate a state from the group of at least two states. The at least two states are here either the state "a" or the state "b" from the set of possible states which includes at least the states "a" and "b".

The functionality of the mapping unit 38 is for instance implemented in software, so that the mapping unit includes a processing unit in the manner of a microprocessor or suchlike and a memory, into which a computer program which can be executed by a processing unit in the manner of a microprocessor for realizing mappings of internal states to state information for the communication module 12, as described here in principle, can be loaded or is loadable. The functionality of the mapping unit may also be realized in the form of an ASIC or suchlike. The functionality of the ASIC should apply for the interpretation of the subsequent claims as a computer program, wherein the ASIC then represents an example of a processing unit in the manner of a microprocessor.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A method for operating an automation device with an internal finite state machine, a mapping unit, an internal data interface operatively connected for flow of information between the internal finite state machine and the mapping unit, and the mapping unit operatively connected for flow of the same information between the internal data interface and an external data interface of a communication module, the method comprising the steps of:
routing state information of the internal finite state machine to the mapping unit via the internal data interface,
converting in the mapping unit by way of a linking logic of the mapping unit the state information received by the mapping unit into separate state information, and
providing with the mapping unit the derived separate state information to a communication unit of the communication module.

2. The method of claim 1, and further comprising the steps of:
buffering in the mapping unit states of the state information received from the internal finite state machine, and
providing with the mapping unit the separate state information by also taking into consideration states stored in the mapping unit.

3. The method of claim 1, and further comprising the steps of:
routing to the mapping unit via the internal data interface an additional item of information in addition to the states of the state information received from the internal finite state machine, and
providing with the mapping unit the separate state information by also taking into consideration the additional information.

4. The method of claim 2, and further generating with the mapping unit a combined state based on a current state received from the internal finite state machine and on a buffered state.

5. The method of claim 3, and further comprising the steps of:
buffering in the mapping unit states of the state information received from the internal finite state machine, and
generating with the mapping unit a state from a group of at least two states from a current state received from the internal finite state machine, a buffered state and an additional item of information.

6. The method of claim 1, wherein the automation device is a drive control unit.

7. An automation device comprising:
an internal finite state machine,
a mapping unit comprising a linking logic,
an internal data interface operatively connected for flow of information between the internal finite state machine and the mapping unit, and
a communication module having a communication unit connected to an external data interface, wherein the mapping unit is operatively connected between the internal data interface and the communication module for flow of the same information,
wherein the automation device is configured to
route state information of the internal finite state machine to the mapping unit via the internal data interface,
convert in the mapping unit by way of a linking logic of the mapping unit the state information received by the mapping unit into separate state information, and
provide with the mapping unit the derived separate state information to the communication unit.

8. The automation device of claim 7 comprising a non-transitory memory with a computer program, which when loaded in a processor of the automation device and executed by the processor, causes the automation device to
route state information of the internal finite state machine to the mapping unit via the internal data interface,
convert in the mapping unit by way of a linking logic of the mapping unit the state information received by the mapping unit into separate state information, and
provide with the mapping unit the derived separate state information to the communication unit.

9. The automation device of claim 7, wherein the communication module is constructed as a unit which is detachably connected to the automation device.

10. A computer program having program code embodied in a non-transitory medium, wherein the program code, when loaded into a memory of an automation device having an internal finite state machine, a mapping unit having linking logic, an internal data interface operatively connected for flow of information between the internal finite state machine and the mapping unit, and the mapping unit operatively connected for flow of the same information between the internal data interface and an external data interface of a communication module, and executed by the automation device, causes the automation device to route state information of the internal finite state machine to the mapping unit via the internal data interface, convert in the mapping unit by way of a linking logic of the mapping unit the state information received by the mapping unit into separate state information, and provide with the mapping unit the derived separate state information to a communication unit of the communication module.

11. A computer program product having program code stored on a non-transitory machine-readable data carrier, wherein the program code when loaded into a memory of an automation device having an internal finite state machine, a mapping unit having linking logic, an internal data interface operatively connected for flow of information between the internal finite state machine and the mapping unit, and the mapping unit operatively connected for flow of the same information between the internal data interface and an external data interface of a communication module, and executed by the automation device, causes the automation device to route state information of the internal finite state machine to the mapping unit via the internal data interface, convert in the mapping unit by way of a linking logic of the mapping unit the state information received by the mapping unit into separate state information, and provide with the mapping unit the derived separate state information to a communication unit of the communication module.

\* \* \* \* \*